Jan. 21, 1969   L. K. PARKER ET AL   3,423,670
MAGNETIC SHIELD ARRANGEMENT FOR A HIGH FLUX HOMOGENEOUS
FIELD-PRODUCING MAGNET
Filed Aug. 2, 1965
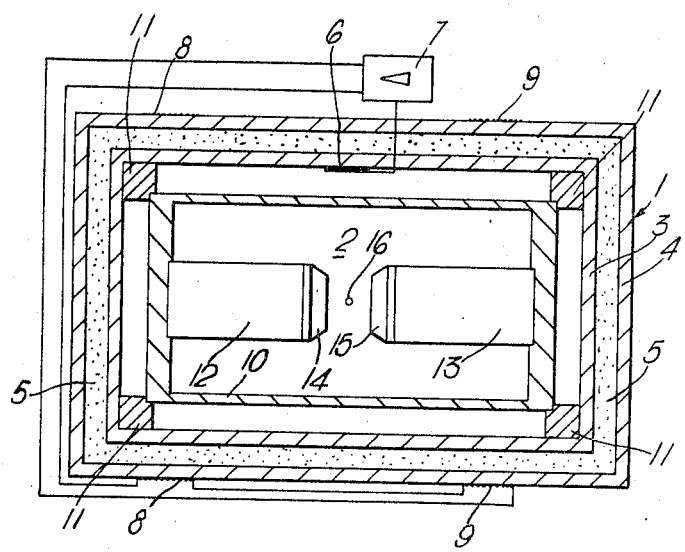
LESLIE K. PARKER
JOHN B. LEANE
   INVENTORS
BY *Tyler S. Roundy*
   ATTORNEY United States Patent Office 3,423,670
Patented Jan. 21, 1969

3,423,670
MAGNETIC SHIELD ARRANGEMENT FOR A HIGH FLUX HOMOGENEOUS FIELD-PRODUCING MAGNET
Leslie Kearton Parker, Great Kingshill, and John Bryant Leane, Beaconsfield, England, assignors to Perkin-Elmer Limited, Beaconsfield, England, a British company
Filed Aug. 2, 1965, Ser. No. 476,362
Claims priority, application Great Britain, Aug. 7, 1964, 32,245/64
U.S. Cl. 324—.5
Int. Cl. G01n 27/00; G01r 33/08
3 Claims

ABSTRACT OF THE DISCLOSURE

An enclosure for an instrument requiring constant magnetic field conditions comprising a coil mounted about the enclosure for maintaining a constant magnetic field within the enclosure when a field-correcting current flows in the coil, a transducer positioned within the enclosure for providing a signal responsive to a departure from the constant magnetic field conditions, and amplifying means coupled to said transducer and coil adapted for causing a field-correcting current to flow in said coil in response to a signal from said transducer.

---

When using scientific apparatus which operates in response to magnetic fields it is frequently important to eliminate or reduce the effects of external magnetic fields in the surrounding space. One example of such apparatus, where the avoidance of external magnetic field effects is particularly important, is the nuclear magnetic resonance spectrometer. In the use of such an instrument the region in which the sample under test is subjected to the magnetic field, and the instrument itself must be kept free of external magnetic influences. Although some instruments may be used under closely controlled conditions where external effects do not come into play, it is more frequently necessary to allow for changes brought about by external sources such as electrical power supply and conversion apparatus and this requirement is made more difficult where there is any likelihood of mobile sources of magnetic fields such as vehicles, movable laboratory apparatus and so forth.

According to the present invention an enclosing structure for a sample or an instrument requiring constant magnetic field conditions comprises one or more coils mounted outside the enclosure for maintaining constant magnetic field conditions therein, a transducer located within the enclosure so as to provide a signal in response to a departure from the contant magnetic field conditions, and an amplifier for the signal connected to the coil or coils so that a departure from the constant magnetic field conditions causes the coil or coils to produce a correcting field within the enclosure. Accordingly the magnetic field conditions therein remain substantially constant even though the enclosures may be subjected to stray magnetic fields caused by sources such as those already mentioned. In practice the effect of extraneous magnetic fields cannot be entirely eliminated since a small departure from the constant field conditions is necessary in order to maintain the signal to the amplifier. However if the amplifier has a high gain this departure can be reduced to negligible magnitude.

If it is necessary to compensate for magnetic fields in more than one direction, then more than one transducer and associated amplifiers and coils are required but in the majority of cases compensation in one direction is sufficient. In the example referred to above the important direction is that of the main magnetic field of the instrument and for this purpose it is sufficient to use a single transducer and to compensate for the field in the one direction. In some applications it may be desirable that there should be no magnetic field within the enclosure in which case the constant magnetic field conditions will be zero and the transducer will therefore be arranged to give a signal on departure from these zero conditions.

By way of example a particular construction of an enclosing structure in accordance with the invention will now be described with reference to the accompanying sectional drawing.

The enclosing structure shown generally as 1 has a rectangular box-like form which defines the enclosure 2. As shown the structure has two walls 3 and 4 which are of non-magnetic material with the space 5 between them preferably filled with powdered ferro-magnetic material such as iron powder or filings. This arrangement is of particular use if the structure is large as it enables the ferromagnetic material to be installed on the site. Alternatively, the structure could have single walls preferably of a ferromagnetic material such as a suitable grade of steel, cast iron or mumetal. As a further alternative the walls could be formed of plastic such as an epoxy resin loaded with ferromagnetic material.

Located within the enclosure is a transducer 6 in the form of a magnetometer of the "Fluxgate" type as sold by Kelvin and Hughes. Such a magnetometer gives a linear signal in response to orientation of an applied magnetic field and resolves the field into components which are orthogonal and parallel to its axis. The magnetometer 6 is mounted so that its detecting element has its axis parallel to that of the magnetic field axis of an instrument placed within the enclosure.

The signal from the magnetometer is applied to the input of an amplifier 7. The amplifier output is connected to a pair of coils 8 and 9 which are wound around the outer wall 4 of the enclosure so as to produce a magnetic field when energised which is parallel to the axis of the detecting element. As shown an instrument in the form of the magnet assembly of a nuclear magnetic resonance spectrometer is located within the enclosure 2. The assembly comprises a magnet yoke 10 which is spaced from the inner wall 3 by non-magnetic blocks 11, and a pair of magnets 12 and 13 fitted to the yoke 10. Each magnet has a respective pole piece 14 and 15 which define a working gap in which a sample 16 is held for analysis by means not shown.

The magnetic axis of the magnet assembly is parallel to the axis of the detecting element of the magnetometer 6 and also to the axis of the coils 8 and 9. If therefore the detecting element senses any departure from the constant magnetic field conditions, a signal will be produced which after amplification in the amplifier 7, will cause a correcting magnetic field to be set up by the coils 8 and 9 in opposition to the field causing the departure from the constant magnetic field conditions. Thus compensation will be provided when the field conditions change within the enclosure and thus the effective change therein will be reduced to negligible proportions. In one particular case the system described has been found capable of holding the magnetic field conditions constant to within 1 part in $10^8$ parts.

We claim:
1. In a nuclear magnetic resonance instrument, a magnetic field shielding arrangement comprising:
   a source of a magnetic field;
   a body of ferromagnetic material adapted for enclosing and substantially confining the magnetic field within a preestablished volume;

an enclosure body including a ferromagnetic material for enclosing said source and field confining body;
a magnetic field sensitive transducer positioned within the enclosure between an inner surface thereof and said field confining means;
a coil mounted on said enclosure for maintaining a constant magnetic field within the enclosure; and
amplifying means coupled to said transducer and to said coil for causing a field-correcting current to flow in said coil in response to a signal from said transducer.

2. The apparatus of claim 1 wherein the enclosure is formed by walls having inner and outer faces of non-magnetic material defining an enclosed volume containing a powdered ferromagnetic material.

3. The shielding arrangement of claim 1 wherein said magnetic field source includes first and second axially aligned magnets having an air gap therebetween and said field-confining means comprises a magnet yoke member.

References Cited

UNITED STATES PATENTS

| | | | |
|---|---|---|---|
| 2,026,060 | 12/1935 | Pratt | 174—35 |
| 2,463,778 | 3/1949 | Kellogg | 174—35 |
| 2,864,963 | 12/1958 | Dornstreich | 174—35 |
| 3,166,727 | 1/1965 | Beurtherel | 336—233 |
| 3,187,237 | 6/1965 | Craig | 335—301 |
| 3,287,630 | 11/1966 | Gang | 324—0.5 |

FOREIGN PATENTS

| | | |
|---|---|---|
| 611,742 | 11/1948 | Great Britain. |
| 604,329 | 7/1948 | Great Britain. |

RUDOLPH V. ROLINEC, *Primary Examiner.*

M. J. LYNCH, *Assistant Examiner.*

U.S. Cl. X.R.

174—35; 335—301